Figure 1:
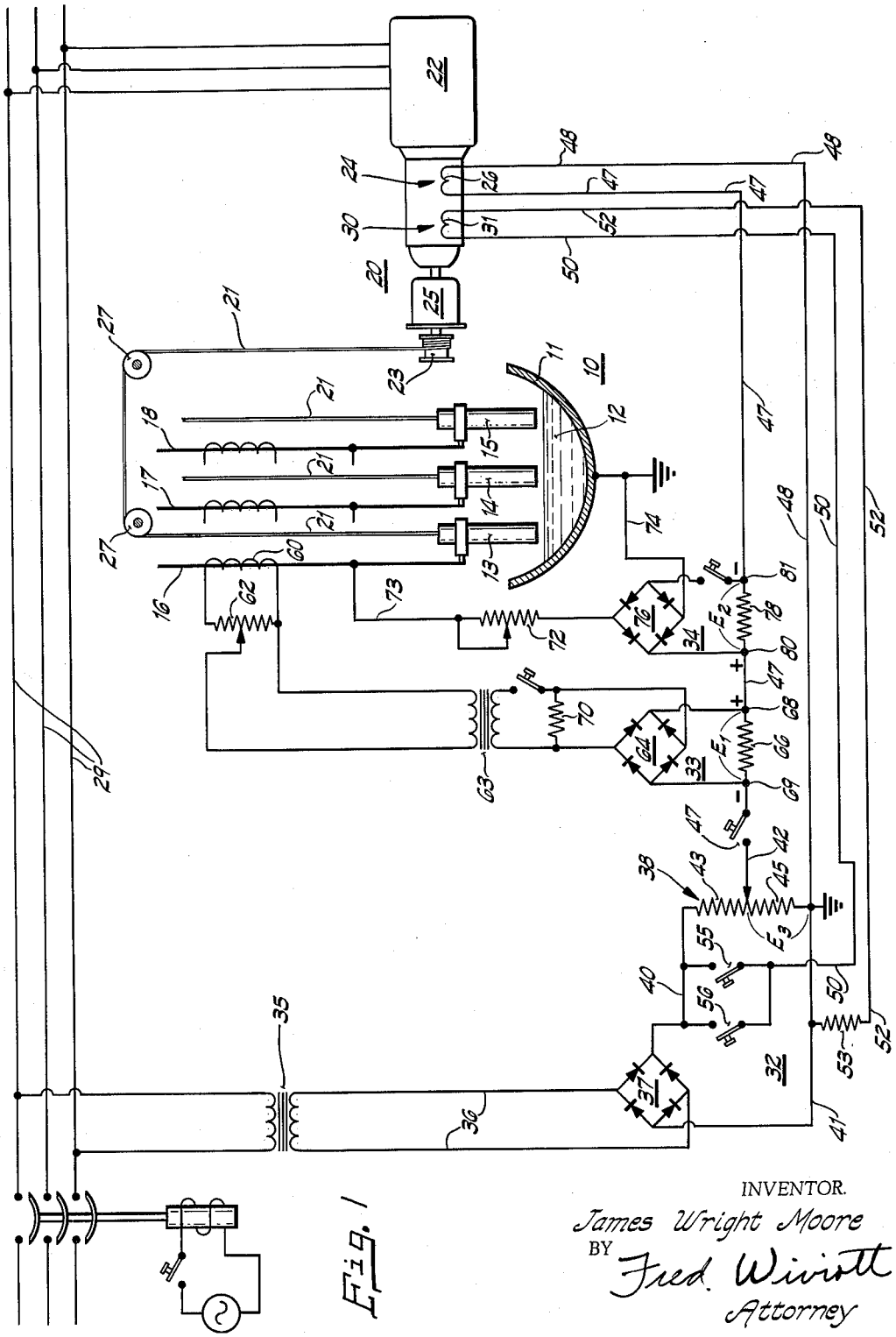

INVENTOR.
James Wright Moore
BY Fred. Wiviott
Attorney

Jan. 11, 1966   J. W. MOORE   3,229,148
ARC FURNACE ELECTRODE CONTROL
Filed April 22, 1963   3 Sheets-Sheet 2

INVENTOR.
James Wright Moore
BY
Fred Wiviott
Attorney

Jan. 11, 1966  J. W. MOORE  3,229,148

ARC FURNACE ELECTRODE CONTROL

Filed April 22, 1963  3 Sheets-Sheet 3

INVENTOR.
James Wright Moore
BY
Fred Wiviott
Attorney

United States Patent Office 3,229,148
Patented Jan. 11, 1966

3,229,148
ARC FURNACE ELECTRODE CONTROL
James W. Moore, Pittsburgh, Pa., assignor to McGraw-Edison Company, Milwaukee, Wis., a corporation of Delaware
Filed Apr. 22, 1963, Ser. No. 274,736
7 Claims. (Cl. 314—75)

This invention relates to electric arc furnaces and more particularly to aparatus for controlling the position of arc furnace electrodes.

It is common practice in the production of high grade steel to utilize polyphase electric arc furnaces having a plurality of electrodes and eletrode positioning means associated with each electrode. Current flows in such furnaces from the electrodes to the grounded furnace charge. That portion of the current path between the electrode and the furnace charge is an arc, which provides the heat necessary for furnace operation.

Means are generally provided to position each of the electrodes relative to the furnace charge in accordance with the length of its respective arc as indicated by the arc current and the arc voltage so that when the arc current rises, indicating that the arc is too short, the electrode is raised and when the arc voltage rises, indicating that the arc is too long, the electrode is lowered. Such variations in arc length occur as the electrode burns away during normal furnace operation and also because the height of furnace charge such as scrap metal lowers as it fluidizes.

One type of electrode positioning apparatus employs a reversible electric motor and a winch connected to the electrode by means of a cable and sheaves. The motor is responsive to the electrode current and voltage sensing device. In the normal application of electrode winch and cable systems the drive motor is of the D.C. reversing type so that each time the electrode is to be moved the motor must be started, accelerated to the required speed and then run for that time necessary to make the electrode position correction. If a correction is to be made in the opposite direction it is necessary to stop the motor, reverse its direction, and bring it up to speed. In actual furnace operation the winch motor is continuously in movement, running, stopping and reversing.

In a D.C. motor-winch type electrode positioning apparatus, the total inertia of the system is very high due to the inherent inertia of the motor rotor. Actual measurements indicate that more than 90% of the inertia of such a system is in the D.C. motor rotor. As a result, the movement of the electrode is undesirably delayed when the motor is initially energized or reversed. In addition, the sensing control sginal change to a rotating generator requires significant time before the generated voltage builds up sufficiently to operate the electrode drive motor.

It is an object of the invention to provide electrode positioning apparatus which responds accurately and rapidly to variations in electrode voltage and current and which has a unidirectional motor running continuously at full speed during furnace operation.

A further object of the invention is to provide an electromagnetic clutch which is connected for positioning an arc furnace electrode and which is energized by a bias voltage signal sufficient to sustain the electrode and which is also energized by voltage signals proportional to electrode voltage and current for moving the electrode relative to the furnace body. A still further object is to provide electroresponsive brake means having an energizing circuit connected to the bias voltage signal source.

Another object of the invention is to provide a unidirectional motive means and a pair of output means driven by the motive means and a pair of electromagnetic clutches for selectively connecting each output means to an arc furnace electrode in accordance with electrode current and voltage wherein a bias voltage is applied to each clutch for holding the electrode in a stable condition when balanced conditions are achieved.

Figure 2:
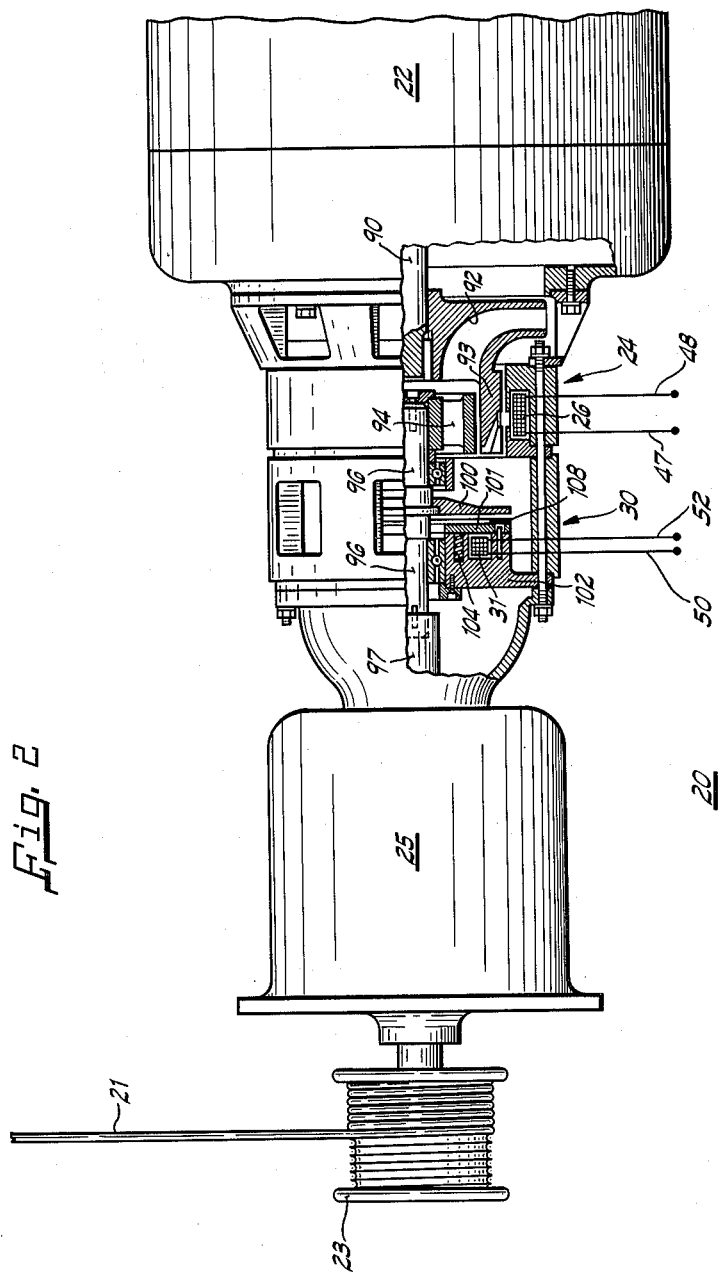
Figure 3:
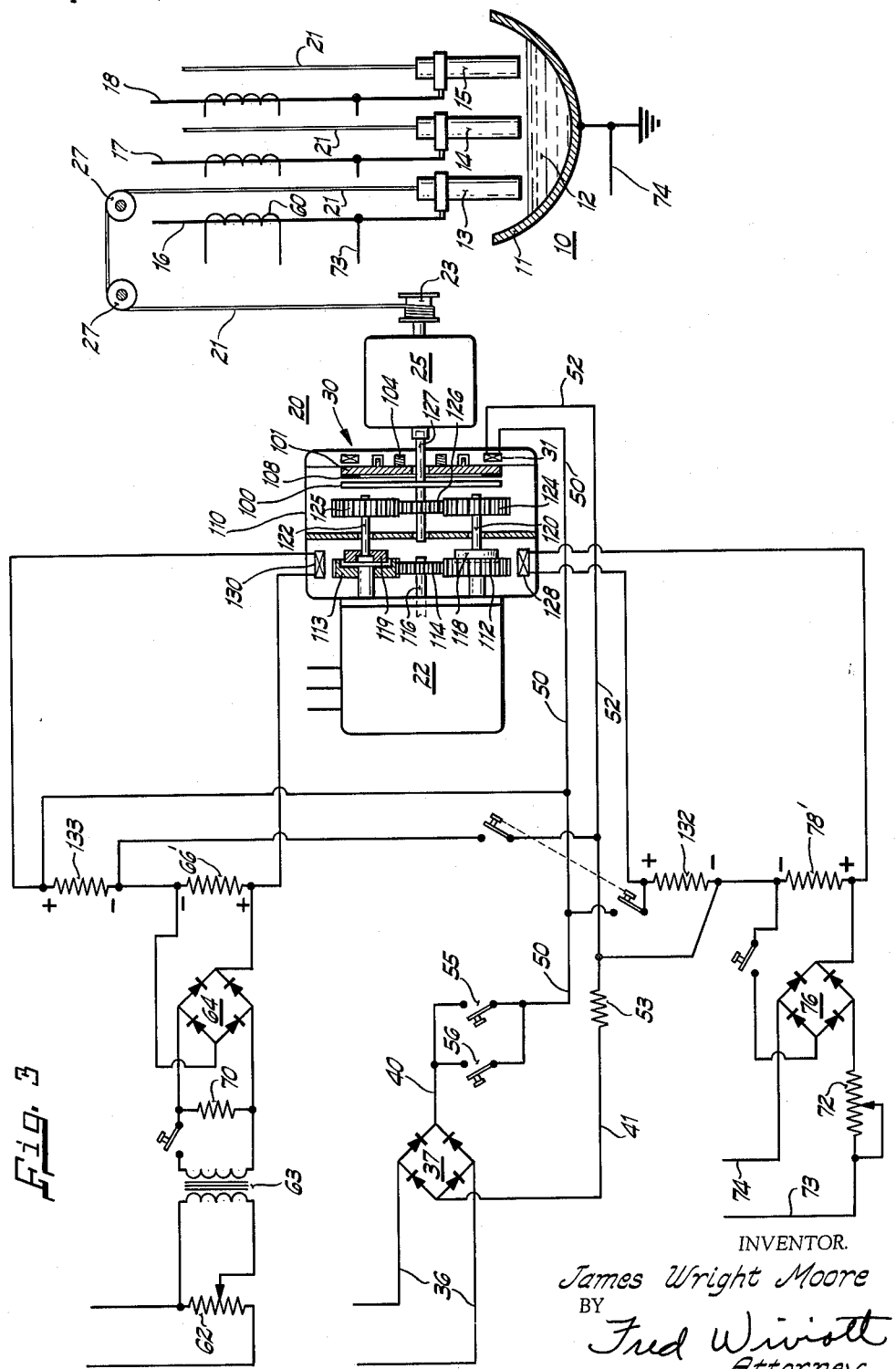

These and other objects and advantages of the instant invention will become more apparent from the detailed description thereof taken with the accompanying drawings in which:

FIG. 1 schematically illustrates the electrode positioning apparatus according to the instant invention;

FIG. 2 shows the electromagnetic clutch employed in the device illustrated in FIG. 1; and FIG. 3 illustrates an alternate embodiment of the instant invention.

Referring to the drawings in greater detail, an electric arc furnace 10 is shown to include a furnace body 11 containing a bath of molten furnace charge or melt 12 and three movable electrodes 13, 14 and 15 positioned above the melt 12. The electrodes 13, 14 and 15 are connected to three phase supply conductors 16, 17 and 18, respectively, which are, in turn, connected to a suitable source of three phase power 29.

An electrode positioning apparatus 20 is mechanically coupled to each of the electrodes 13, 14 and 15 by a cable 21 so that said electrodes may be raised and lowered in accordance with furnace conditions. Since identical positioning mechanisms 20 are provided for controlling the position of each of the electrodes 13, 14 and 15, only one of them is illustrated for the sake of brevity.

The electrode positioning apparatus 20 includes a drive motor 22 mechanically coupled to a winch drum 23 through an electromagnetic clutch 24 and a gear reducing mechanism 25. The clutch 24 is schematically illustrated in FIG. 1 to have a control winding 26. A cable 21 is connected at one end to the winch drum 23 and extends over a pair of sheaves 27 to connect at its other end to the upper end of the electrode 13. The drive motor 22 can be either A.C. or D.C. but is preferably a NEMA design D, high troque A.C. three-phase induction motor which is shown connected to the three-phase supply system 29. As will be pointed out more specifically hereinafter, the motor 22 operates continuously without reversal in a direction which tends to raise the electrode 13 to counteract the weight thereof which is overhauling in the downward direction. When the electrode positioning apparatus is not being used the electrode is held by an electromagnetic brake 30 having a winding 31.

The electrode positioning device also includes a bias supply circuit 32 for the clutch 24, an electrode current proportional signal circuit 33, and an electrode voltage proportional signal circuit 34. The signal circuit 33 is connected to the bias supply circuit 30 and to the electrode 13 for producing a voltage signal proportional to the current flowing in said electrode and the signal circuit 34 is coupled to the electrode 13 for producing a voltage signal proportional to potential across said electrode. As will be explained in greater detail hereinafter, the signal circuits 33 and 34 are operative to increase or decrease the voltage supply to the clutch 24 in accordance with variations in the voltage and current conditions in electrode 13.

The bias supply circuit 30 is coupled across one phase of the power supply 29 by means of a potential transformer 35, the secondary winding of which is connected by conductors 36 to the input terminals of a full wave rectifier 37. The bias supply circuit also includes a potentiometer 38 which is connected by conductors 40 and 41 across the output terminals of the full wave rectifier 37 so that a constant unidirectional voltage will be derived across the potentiometer 38.

Potentiometer 38 includes a wiper 42, which divides the potentiometer's resistance into an upper portion 43 and a lower portion 45. Conductors 47 and 48 connect the lower potentiometer portion 45 to the clutch control winding 26. The bias supply circuit 32 also provides energy for the coil 31 of the brake 30 through a first conductor 50 which connects one side of the coil 31 to conductor 40 and the second conductor 52 which connects the other side thereof to conductor 41 through a resistor 53. A switch 55 in conductor 50 allows the brake coil 31 to be energized independently of the other phases of the device while a second switch 56 connected parallel with the switch 55 and which is interlocked with the electrode positioning control circuits of the other phases, allows simultaneous energization of the brakes in each control circuit.

The circuit 33 is operative to provide a voltage signal proportional to the current in electrode 13. Electrode 13 current is sensed by means of a current transformer 60 whose secondary is inductively coupled to electrode power supply conductor 16. A voltage proportional to this sensed current is derived across a potentiometer 62 shunting the secondary of current transformer 60 and which is coupled by a potential transformer 63 to the input terminals of a full wave rectifier 64. The output terminals of rectifier 64 are connected across a resistor 66 which is connected in conductor 47 and in series with the wiper 42 of potentiometer 58. From the foregoing it would be appreciated that a voltage signal will be derived across resistor 66, which is proportional to the current flowing in the electrode supply conductor 16 and, disregarding the remainder of the circuit, this derived voltage signal will be such that terminal 68 of resistor 66 will be positive, relative to the terminal 69 thereof. It will also be appreciated that the voltage signal $E_1$ across resistor 66 will be additive to the bias voltage $E_3$ across the lower portion 45 of potentiometer 38.

The circuit 34 is operative to provide a voltage signal proportional to the voltage across electrode 13. Electrode voltage is sensed by means of a potentiometer 72 connected across the electrode 13 by means of conductors 73 and 74, which are connected to the input terminals of a full wave rectifier 76. The output terminals of rectifier 76 are connected across a resistor 78 connected in conductor 47 and in series with the wiper 42 of potentiometer 38. The rectifier 76 is oriented in such a manner that, ignoring the remainder of the circuitry, the terminal 80 of resistor 78 will be positive relative to the terminal 81 thereof. It can be seen that the voltage signal $E_2$ across resistor 78 will be subtractive from the bias voltage $E_3$.

When the voltage and current conditions in the electrode 13 are at their desired values the bias voltage $E_3$ plus the voltage signal $E_1$ minus the voltage signal $E_2$ will energize the clutch coil 26 to the degree necessary to result in sufficient coupling between the motor 22 and the gear mechanism 25 to just hold the electrode 13 against its gravitational force. Under this condition of operation the system can be considered in balance.

Should the arc gap become shorter than desired, causing an increase in arc current and a decrease in arc voltage, the voltage signal $E_1$ will increase while the voltage signal $E_2$ decreases. As a result, the energization of the clutch coil 26 will be in excess of that necessary to support the electrode so that the coupling between the motor 22 and the gear mechanism 25 will be increased to the point where the electrode will begin rising at a speed functionally related to the degree of unbalance. As the electrode rises the electrode current will decrease and the electrode voltage will increase resulting in a corresponding decrease in $E_1$ and increase in $E_2$. This will continue until the system is again in balance whereupon the electrode will come to rest.

If, on the other hand, the arc gap becomes longer than desired, causing increased electrode voltage and decreased electrode current, the voltage signal $E_2$ will correspondingly increase and the voltage signal $E_1$ correspondingly decrease. This unbalances the system and causes insufficient coupling between the motor 22 and the gear mechanism 25 to hold the electrode 13 and it begins to move toward the charge 12. As the electrode 13 approaches the charge 12 the electrode current will increase and the electrode voltage decrease resulting in an increase in the energization of the clutch coil 26 until the coupling between motor 22 and the gear mechanism 25 again becomes sufficient to support the electrode.

Those skilled in the art will appreciate that the furnace electrode is initially in an elevated position and must first be lowered toward the furnace charge for a melting operation and commence. In addition, after the completion of a melting operation the electrode must be raised so that it can be tapped and recharged. It can therefore be seen that because the voltage $E_3$ can be adjusted by moving the tap on potentiometer 43, the bias voltage may be adjusted to control the initial electrode lowering speed at the commencement of a furnace operation and to control the final electrode raising after melting operation has been completed.

Referring now to FIG. 2, which illustrates the details of the clutch mechanism 24, the output shaft 90 of the motor 22 is shown mechanically coupled to a fan blade 92 and a clutch input member 93, so that these members will rotate at the speed of motor 22. The clutch input member 93 is generally annular in configuration and is disposed coaxially within the clutch control winding 26. A clutch output member 94 is mechanically coupled to a clutch output shaft 96 and is also generally annular in configuration and disposed coaxially within the clutch input member 93. The clutch output shaft 96 is coupled to the input shaft 97 of the gear reducing mechanism 25 so that rotation of the clutch output shaft 96 will be transmitted to the electrode 13.

As will be understood by those skilled in the art, the speed of rotation of the output member 94, and hence that of the output shaft 96, will depend upon the degree of excitation in the control coil 26. As stated hereinabove, when the electrode voltage and current are at the desired values the excitation of coil 26 will be such as to cause sufficient coupling between the members 93 and 94 to just sustain the electrode in a stable position. Accordingly, when the excitation of coil 26 falls below this value this coupling will be insufficient to hold the electrode and it will begin moving toward the furnace charge 12 thereby shortening the arc. Conversely, when the excitation of coil 26 exceeds this value the coupling will be sufficient to move the electrode 13 upwardly and away from the charge 12 and to thereby increase the length of the arc.

As seen in FIG. 1, the brake coil 31 is connectable by switches 55 or 56 in a parallel circuit relation with the bias voltage potentiometer 38 so that when there is bias voltage the coil 31 will be energized to hold the plate 101 away from the disc 100 and thereby allow the shaft 96 to rotate. A loss of biasing voltage, on the other hand, which would otherwise allow the electrode 13 to drop into the furnace, also causes a loss in power to the brake coil 31 so that the springs 104 will move the plate 101 into engagement with the disk 100 and thereby arrest downward movement of the electrode.

The brake 30 is shown in FIG. 2 to be disposed adjacent the clutch 24, and to include a disk 100 affixed to and rotatable with the clutch output shaft 96. Adjacent the disk 100 and substantially coextensive therewith is a plate 101 which is slidably mounted in a rigid base portion 102 for axial movement relative to the shaft 96 and which has a frictional facing 108 opposite the disk 100. A plurality of springs 104 (only one of which is seen in FIG. 2) are disposed in the base portion 102 for urging the plate 101 into high pressure engagement with the disk 100.

FIG. 3 shows an alternate embodiment of the invention wherein a double electromagnetic clutch assembly 110 is provided so that the electrode 13 may be positively driven in a raise or lower direction. This is necessary when the inertia of the electrode drive and support assembly is sufficient to support the electrode so that it will not lower from its own wieght but must be driven downwardly.

More specifically, the double electromagnetic clutch 110 includes a pair of input members or gears 112 and 113 which are each driven at a constant rotational speed in opposite directions by a pinion 114 coupled to the output shaft 116 of the motor 22. A pair of clutch output members 118 and 119 are disposed adjacent the input members 112 and 113, respectively, and each is independently rotatably mounted relative thereto on shafts 120 and 122. A pair of output gear members 124 and 125 are also mounted on the shafts 120 and 122, respectively, for rotation with the output members 118 and 119. In addition, each of the output gears 124 and 125 engage a pinion 126 mounted on the clutch output shaft 127 which is coupled to the gear reduction mechanism 25. Also mounted on the output shaft 127 is a brake mechanism 30 which operates in the same manner as the brake discussed with respect to the embodiment of FIGS. 1 and 2. A first winding 128 is operative to couple the first clutch output member 118 to input member 112 and a second winding 130 is operative to couple the second clutch output member 119 to input member 113.

The clutch coil 128 is connected to a voltage supply circuit having a resistor 78' which is connected to the electrode 13 so that the voltage derived across resistor 78' is proportional to the electrode voltage. In addition, a bias resistor 132 is connected in series with resistor 78' and is connected to conductors 40 and 41 so that the voltage derived across resistor 132 is relatively fixed and is in an opposite sense to that derived across resistor 78'.

Similarly, the clutch coil 130 is connected to a voltage supply circuit having a resistor 66' which is connected to the electrode 13 so that the voltage derived across it will be proportional to electrode current. A second bias resistor 133 is connected in series with resistor 66' and to power supply conductors 40 and 41 so that the voltage derived across it will be relatively fixed and in the opposite sense to that derived across resistor 66'.

When the electrode current and voltage conditions are at the desired value the voltage derived across resistors 66' and 78' will be sufficient to neutralize the bias voltages across resistors 132 and 133 so that there will be no coupling between either input member 112 or 113 and their associated output members 118 or 119, respectively, and the electrode 13 will remain stationary.

When the electrode voltage increases and the electrode current decreases from their desired values, indicating that the gap between the electrode 13 and the furnace charge 12 is too long, the derived voltage across resistor 78' will increase and the derived voltage across resistor 66' will decrease. This increase in potential across resistor 78' will be sufficient to overcome the cancelling effect of the bias voltage across resistor 132 so that coil 128 is sufficiently energized to couple output member 118 to a gear 112 and the output shaft 127 of the clutch mechanism 110 will begin rotating in an electrode lower direction. As a result of the decrease in the derived voltage across resistor 66' the voltage supplied to coil 130 will remain insufficient to cause coupling between the gear 113 and the output member 119. Thus, the electrode 13 will begin lowering toward the furnace charge 12 and this will continue until electrode voltage and current conditions return to their desired values.

On the other hand, if the electrode current becomes larger than the desired value and the electrode voltage falls below a predetermined level indicating that the gap between electrode 13 of the furnace charge 12 is too short, the derived voltage across resistor 66' will overcome the bias potential across resistor 133. This sufficiently energizes coil 130 so that output member 119 will be coupled to gear 113 and the electrode will begin moving upwardly until furnace conditions are again in balance.

The use of bias voltages in the embodiment of FIG. 3 to cancel both the voltage and current signals from the electrode when the arc gap length is at the desired value, allows for greater sensitivity and flexibility than would be the case if these signals were applied to both coils in a cancelling relation.

While only a pair of embodiments of the invention have been disclosed, it is not intended that the invention be limited thereby but only by the scope of the appended claims.

I claim:

1. In an electric arc furnace the combination of, a furnace body and an electrode, electromotive means, reversible electrode means, electroresponsive means operable to couple said electromotive means to said electrode means to a degree functionally interrelated to the magnitude of applied electrical signals to effect the movement of said electrode relative to said furnace body, the speed of said relative movement being a function of said degree of coupling, a first electrical signal source proportional to the current in said electrode and connected to said electroresponsive means to energize the same for modifying said coupling in an electrode raising sense and a second electrical signal source proportional to the voltage in said electrode and connected to said coil to energize the latter for modifying said coupling in an electrode lowering sense, coupling being sufficient to raise said electrode when the ratio of said first and second signals exceeds a predetermined value and to lower said electrode means when said ratio falls below a predetermined value, electrical bias signal means connected to said electroresponsive means in a subtractive sense relative to at least one of said first and second electrical signals, and means for adjusting said electrical bias signal means to control the initial lowering speed and the final raising speed of said electrode at the beginning and end of a furnace operation.

2. In an electric arc furnace the combination of, a furnace body and an electrode, electromotive means, reversible electrode support means, electroresponsive means operable to couple said electromotive means to said electrode support means to a degree functionally interrelated to the magnitude of applied electrical signals to effect the movement of said electrode relative to said furnace body, the speed of said relative movement being a function of said degree of coupling, electrical bias signal means for energizing said electroresponsive means to effect the coupling of said motive means to said electrode, a first electrical signal source proportional to the current in said electrode and connected to said electroresponsive means in an additive sense to said bias signal and a second electrical signal proportional to the voltage in said electrode and connected to said coil electroresponsive means in a subtractive sense to said bias signal, said coupling being sufficient to raise said electrode when the ratio of said first and second signals exceeds a predetermined value and to lower said electrode means when said ratio falls below a predetermined value, and means for adjusting said bias voltage signal to control the initial lowering speed and the final raising speed of said electrode at the beginning and end of a furnace operation.

3. In an electric arc furnace the combination of, a furnace body and an electrode, an energy source connected to said electrode, unidirectional electric motor means, reversible electrode support means, magnetic clutch means including a first portion rotatable with said motor, a second independently rotatable portion coupled to said electrode support means and a coil operable to couple said portions to a degree functionally interrelated to the magnitude of an applied electrical signal to effect the movement of said electrode relative to said furnace body, the speed of said relative movement being a function of said degree of coupling, a bias voltage source for energizing said coil, a first circuit means connected to said energy source and to said coil for energizing the latter with a first voltage proportional to the current in said electrode and additive to said bias voltage to increase the coupling between said first and second positions, and a second circuit means connected to said energy source and to said coil for energizing the latter with a second voltage proportional to the voltage in said electrode and subtractive from said bias voltage to decrease the coupling between said first and second portions, said coupling being sufficient to raise said electrode when the ratio of said first and second voltages exceeds a predetermined value and to lower said electrode means when said ratio falls below a predetermined value, said coupling being sufficient to support the weight of said electrode when the voltage and current in said electrode have a predetermined relation, and means for adjusting said bias voltage to control the initial lowering speed and the final raising speed of said electrode at the beginning and end of a furnace operation.

4. In an electric arc furnace the combination of, a furnace body and an electrode, electromotive means operable in a first direction, reversible electrode support means, electromagnetic clutch means including operating coil means for coupling said electromotive means to said electrode support means to effect the movement of said electrode relative to said furnace body, bias voltage means connected for energizing said coil means to effect the coupling of said motive means to said electrode, a first voltage source proportional to the current in said electrode and connected to said coil in an additive sense to said bias voltage, and a second voltage source proportional to the voltage in said electrode and connected to said coil means in a subtractive sense to said bias voltage, said coupling being sufficient to raise said electrode when the ratio of said first and second voltage sources exceeds a first predetermined value and to lower said electrode means when said ratio falls below said predetermined value, said coupling being sufficient to support the weight of said electrode when the voltage and current of said electrode have a predetermined relation, and means for adjusting said bias voltage to control the initial lowering speed and the final raising speed of said electrode at the beginning and end of a furnace operation.

5. In an electric arc furnace the combination of, a furnace body and an electrode, electromotive means operable in a first direction, reversible electrode support means, electromagnetic clutch means including operating coil means for coupling said electromotive means to said electrode support means to effect the movement of said electrode relative to said furnace body, bias voltage means connected for energizing said coil means to effect the coupling of said motive means to said electrode, said coupling being sufficient to hold said electrode in a stable position in counteraction to the weight thereof, a first voltage source proportional to the current in said electrode and connected to said coil in an additive sense to said bias voltage, a second voltage source proportional to the voltage in said electrode and connected to said coil in a subtractive sense to said bias voltage, said coupling being sufficient to raise said electrode when the ratio of said first and second voltage sources exceeds a first predetermined value and to lower said electrode means when said ratio falls below said predetermined value, electroresponsive brake means engageable with said electrode support means and releasable when energized to permit movement thereof, energizing circuit means for said brake means and connected to said bias voltage means, and means for adjusting said bias voltage means to control the initial lowering speed and the final raising speed of said electrode at the beginning and end of a furnace operation.

6. In an electric arc furnace the combination of, a furnace body and an electrode, electromotive means, first and second output means coupled to said electromotive means for rotation in opposite directions, reversible electrode support means, first and second electromagnetic clutch means including first coil means operative when energized in a first sense to couple said first output means to said electrode support means to effect the movement of said electrode away from said furnace body and second coil means operable when energized in a first sense to couple said second output means to said electrode support means to effect the movement of said electrode toward said furnace body, bias voltage means connected for energizing each of said coil means in a second sense, a first voltage source proportional to the current in said electrode and connected to energize said first coil means in a first sense, a second voltage source isolated from said first voltage source and proportional to the voltage in said electrode and connected to energize said second coil means in a first sense, said coupling being sufficient to raise said electrode when the ratio of said first and second voltage sources exceeds a first predetermined value and to lower said electrode means when said ratio falls below said predetermined value.

7. In an electric arc furnace the combination of, a furnace body and an electrode, unidirectional electric motor means operable at a relatively constant speed, first and second output means coupled to said motor means for rotation in opposite directions, reversible electrode support means, first and second electromagnetic clutch means including first coil means operative when energized in a first sense to couple said first output means to said electrode support means to effect the movement of said electrode away from said furnace body and second coil means operable when energized in a first sense to couple said second output means to said electrode support means to effect the movement of said electrode toward said furnace body, bias voltage means connected for energizing each of said coil means in a second sense, a first voltage source proportional to the current in said electrode and connected to said first coil means in a first sense, a second voltage source isolated from said first voltage source and proportional to the voltage in said electrode and connected to said second coil means in a first sense, said coupling being sufficient to raise said electrode when the ratio of said first and second voltage sources exceeds a first predetermined value and to lower said electrode means when said ratio falls below said predetermined value, electroresponsive brake means engageable with said electrode support means and releasable when energized to permit movement thereof, and energizing circuit means for said brake means and connected to said bias voltage means.

References Cited by the Examiner
UNITED STATES PATENTS

| | | | |
|---|---|---|---|
| 1,721,081 | 7/1929 | Meyer | 314—113 X |
| 2,020,278 | 11/1935 | Larson | 314—116 |
| 2,045,803 | 6/1936 | Richter | 314—64 |
| 2,773,112 | 12/1956 | Grebe et al. | 13—13 |

ANTHONY BARTIS, *Acting Primary Examiner.*

JOSEPH V. TRUHE, SR., *Examiner.*

UNITED STATES PATENT OFFICE
CERTIFICATE OF CORRECTION

Patent No. 3,229,148                          January 11, 1966

James W. Moore

It is hereby certified that error appears in the above numbered patent requiring correction and that the said Letters Patent should read as corrected below.

Column 6, line 34, for "coil" read -- electroresponsive means --; line 36, before "coupling" insert -- said --; line 61, strike out "coil"; column 7, line 11, for "positions" read -- portions --.

Signed and sealed this 31st day of January 1967.

SEAL)
Attest:

ERNEST W. SWIDER                         EDWARD J. BRENNER
Attesting Officer                              Commissioner of Patents